(12) United States Patent
Flixeder et al.

(10) Patent No.: US 11,722,044 B2
(45) Date of Patent: Aug. 8, 2023

(54) GUIDE DEVICE FOR SHUTTLES OF A PLANAR MOTOR

(71) Applicant: B&R INDUSTRIAL AUTOMATION GMBH, Eggelsberg (AT)

(72) Inventors: Stefan Flixeder, Eggelsberg (AT); Michael Hauer, Eggelsberg (AT); Martin Haudum, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 290 days.

(21) Appl. No.: 17/239,897

(22) Filed: Apr. 26, 2021

(65) Prior Publication Data

US 2021/0336522 A1  Oct. 28, 2021

(30) Foreign Application Priority Data

Apr. 27, 2020 (AT) .............................. A 50358/2020

(51) Int. Cl.
*H02K 41/03* (2006.01)
*H02K 16/00* (2006.01)

(52) U.S. Cl.
CPC .......... *H02K 41/031* (2013.01); *H02K 16/00* (2013.01); *H02K 2201/18* (2013.01)

(58) Field of Classification Search
CPC ...... B65G 47/244; B65G 54/00; B65G 54/02; H02K 16/00; H02K 2201/18; H02K 2213/12; H02K 41/02; H02K 41/031
See application file for complete search history.

(56) References Cited

U.S. PATENT DOCUMENTS

| | | | |
|---|---|---|---|
| 9,202,719 B2 * | 12/2015 | Lu | ......................... H02K 1/2795 |
| 10,608,518 B2 | 3/2020 | Brucker et al. | |
| 2018/0009333 A1 * | 1/2018 | King | ....................... B60L 13/10 |

FOREIGN PATENT DOCUMENTS

| | | | | |
|---|---|---|---|---|
| EP | 3 501 878 | | 6/2019 | |
| EP | 3501878 A1 * | 6/2019 | .............. B60L 13/03 |
| EP | 3551558 B1 * | 7/2020 | .............. B61B 13/00 |
| WO | 2018/067567 | | 4/2018 | |
| WO | 2018/176137 | | 4/2018 | |
| WO | WO-2018067567 A1 * | 4/2018 | ........... B65G 17/002 |
| WO | WO-2018176137 A1 * | 10/2018 | .......... B25J 15/0246 |

OTHER PUBLICATIONS

Austria Office Action conducted in counterpart Austria Appl. No. A 50358/2020 (dated Dec. 2, 2020).

* cited by examiner

*Primary Examiner* — Naishadh N Desai
(74) *Attorney, Agent, or Firm* — Greenblum & Bernstein, P.L.C.

(57) ABSTRACT

Guide device for shuttles of a planar motor has a first end and a second end and defines a pose course of a shuttle between the first and second end. The first end, which defines an introductory pose of the shuttle, is arrangeable on a first stator of the planar motor so that the introductory pose corresponds to an operationally controllable pose in relation to the first stator. The second end, which defines an exit pose of the shuttle, is arrangeable on the first stator or a second stator of the planar motor so that the exit pose corresponds to an operationally controllable pose with respect to the first or second stator. The pose course includes at least one pose which is an operationally non-controllable pose with respect to stators of the planar motor. The guide device supports and stabilizes the shuttle in the at least one operationally non-controllable pose.

22 Claims, 8 Drawing Sheets

GUIDE DEVICE FOR SHUTTLES OF A PLANAR MOTOR

CROSS-REFERENCE TO RELATED APPLICATION

The present application claims priority under 35 U.S.C. § 119(a) of Austria Patent Application No. A50358/2020 filed Apr. 27, 2020, the disclosure of which is expressly incorporated by reference herein in its entirety.

BACKGROUND

1. Field of the Invention

The present disclosure relates to a guide device for shuttles of a planar motor, the guide device having a first end and a second end and defining a pose course of the shuttle between the first end and the second end, the first end defining an introductory pose of the shuttle and the first end being able to be arranged on a first stator of the planar motor in such a way that the introductory pose corresponds to an operationally controllable pose in relation to the first stator. The method further relates to a planar motor having a guide device and a method for transporting a shuttle having a guide device.

2. Discussion of Background Information

Planar motors are well known in the prior art. For example, U.S. Pat. No. 9,202,719 B2 discloses the basic structure and mode of operation of such a planar motor.

A planar motor substantially has a transport plane along which one or more transport units, so-called shuttles, can be moved mainly in two dimensions. Drive coils, which are controlled by a control unit in order to generate a moving magnetic field in the desired direction of movement and are distributed on the transport plane, are usually provided on the planar motor for this purpose. The (usually fixed) units that contain the drive coils and form the transport plane are generally referred to as stators. Alternatively, movable permanent magnets can also be provided for generating the moving magnetic field. Furthermore, it is also conceivable that only fixed permanent magnets are mounted on the stator and the moving magnetic field is generated on the shuttle. In connection with the present disclosure, the stationary units of the planar motor are generally referred to as stators and the units moved on the stators are referred to as shuttles, regardless of the mode of operation.

Drive magnets (permanent magnets or electromagnets) are arranged distributed two-dimensionally on the shuttle and interact with the magnetic field of the stator so that a drive force is exerted on the transport unit in the desired direction of movement. The drive coils and the drive magnets are advantageously arranged in such a way that, in addition to a one-dimensional movement along the axes spanned by the transport plane, more complex two-dimensional movements of the shuttle in the transport plane are also possible. A planar motor can be used as a transport device in a production process, for example, wherein very flexible transport processes with complex movement profiles can be implemented.

Modern planar motors make it possible to carry out high-precision movements of a shuttle floating above the stator in the direction of all six rigid body degrees of freedom. By means of the modular structure of the stator (in the form of a segment arrangement), translational movements in two main directions of movement (based on a coordinate system that is fixedly defined with the transport plane) are substantially possible without restriction. In addition, a translation in the third spatial direction ("lifting" or "lowering") and rotations (up to a specific deflection) can be carried out at least to a limited extent. The motor forces and torques required for this are generated by means of (electro) magnetism. The translational movement along the third spatial direction (vertical axis) and the rotational movements are referred to as secondary directions of movement.

Even if the movements of the shuttle can be carried out quickly and precisely within the specified limits with conventional planar motors, the limits of controllability have so far been an insurmountable hurdle. Loss of the controllability of the shuttle (even in just one single secondary direction of movement) could lead to undefined and uncontrollable states of the planar motor and must therefore be avoided at all costs.

WO 2018/176137 A1 discloses planar motors with numerous differently designed shuttles and stators. Among other things, this document teaches how to secure the stator with guideways in a transfer region between a stator of the planar motor and a statorless transport system (e.g. a conveyor belt, robot gripper or similar), so that the shuttle is first floated from the stator into the guideway, then slides on the guideway (e.g. on rollers) and is moved on by the statorless transport system when it has left the region of the magnetic action of the stator.

SUMMARY

Embodiments of the present disclosure provide devices and methods with which the limits of the currently possible movement patterns of shuttles on a planar motor can be exceeded without an undefined or uncontrollable state occurring.

In a first aspect, these and other objectives are achieved by a guide device of the type mentioned at the outset, in which the second end defines an exit pose of the shuttle, the second end being able to be arranged on the first stator or a second stator of the planar motor, so that the exit pose corresponds to an operationally controllable pose with respect to the first stator or the second stator, the pose course comprising at least one pose which is an operationally non-controllable pose with respect to the stators of the planar motor, and the guide device supporting and stabilizing the shuttle in the at least one operationally non-controllable pose. This guide device allows the shuttle to overcome the limits of the operationally controllable poses and even to move the shuttles over poses that are "impossible" per se, without getting into an uncontrollable state.

In connection with the present disclosure, a single stator segment is referred to as a "stator" in particular. A plurality of these individual stator segments can be put together to form a stator field that forms a single flat surface. Such stator fields made up of a plurality of individual stator segments can also be viewed in the broader sense as a single stator. The term "stator" as used herein is not restricted to a specific area size or type. In connection with the present disclosure, any associated arrangement of jointly controllable stator elements can therefore also be referred to as a stator. A stator can therefore either correspond to a single component or to an arbitrarily selected group of components that are combined to form an assembly. Depending on the choice of the system boundaries, a planar motor can thus have any number of stators or only a few stators or only a single stator.

In the context of the present disclosure, a "pose" denotes a spatial position of the shuttle in relation to the stators of the planar motor, the first derivative of the spatial position according to time (i.e. the speed) and the second derivative of the spatial position according to time (i.e. the acceleration) likewise being properties of the pose in each of the six degrees of freedom of movement.

In connection with the present disclosure, a "pose course" is a continuous sequence of poses that a shuttle assumes one after the other during a course of movement. A pose course can have translational and rotational movement components.

A pose of the shuttle that is reachable in a stable manner with the planar motor under given operating conditions is referred to as an "operationally controllable pose." In contrast to this, all other poses in connection with the present disclosure are referred to as "operationally non-controllable poses."

"Operating conditions" refer to operational specifications that define, for example, safe and/or efficient operation of the planar motor. For example, a pose of the shuttle could indeed be attainable with the planar motor per se, but this would only be attainable with an excessive expenditure of energy (for example to build up or maintain an inclined position). In that case, the pose could be viewed as inefficient and therefore not permissible and should therefore be treated as an "operationally non-controllable pose."

A pose is referred to as "reachable in a stable manner" when the planar motor can bring the shuttle into the pose without the shuttle being able to enter an uncontrollable state. The condition and position of the shuttle must also be able to be determined with sufficient accuracy at any time in an operationally controllable pose by measurement or observation.

An operationally non-controllable pose is present if at least one of the above requirements with regard to at least one spatial direction is not met.

In an advantageous embodiment, the mobility of the shuttle can be ensured by the stators of the planar motor along the pose course from the first end to the second end. This can be ensured, for example, by the fact that the shuttle is accelerated in the first portion of the pose course (or before) by the stators of the planar motor to such an extent that the shuttle can continue the further pose course solely due to the kinetic energy without the action of a stator.

Advantageously, the at least one operationally non-controllable pose can have a deviation of the yaw angle and/or the pitch angle and/or the roll angle and/or the stroke height from an operationally controllable pose. As a result, complex movements that can be adapted to different needs can be implemented with the guide device.

In an advantageous embodiment, the pose course of the guide device can run substantially parallel to a transport plane of the planar motor. As a result, it may still be possible to control the movement of the shuttle by the magnetic fields built up by the stators of the planar motor, while the shuttle per se is in a pose that can no longer be regulated. For example, the shuttle can be rotated around the vertical axis into an actually inadmissible region or the shuttle can be raised beyond the maximum permissible stroke height into a region which, although not accessible by the planar motor per se without the support of the guide device, is close enough to the transport plane in order to continue to apply sufficient propulsive force to the shuttle.

Advantageously, the guide device for the shuttle can define a pose course in one or both directions from a first transport plane to a second transport plane of the planar motor, whereby a fast transfer of a shuttle between a first stator arrangement of the shuttle, which arrangement is arranged on a first transport plane, and a second stator arrangement, which is arranged on a second transport plane, is made possible.

In an advantageous embodiment, the first transport plane can be arranged parallel to the second transport plane. In this way, for example, a transition for shuttles between transport planes of different levels can be provided.

In a further advantageous embodiment, the first transport plane and the second transport plane can enclose an angle, in particular a right angle. This makes it possible, for example, to transport shuttles in a simple manner, solely through appropriate regulation of the stators of the planar motor, between flat and vertical planar motor portions, which previously could only be implemented by means of robots or by hand.

The guide device can advantageously form a bridge and/or underpass for the shuttle between the first end and the second end. In the case of intersection points, for example, a collision of shuttles with intersecting poses can be safely avoided in a simple manner and without complex calculations, without any shuttle having to slow down.

In an advantageous embodiment, the guide device can have a mechanical guide and/or a magnetic guide and/or an electromagnetic guide and/or a pneumatic guide. This makes it possible to achieve properties that are optimized for the specific application, such as low sliding friction, stable and exact guidance, and/or high speeds.

According to a further advantageous embodiment, at least one operationally non-controllable pose can violate a specification for safe and/or efficient operation of the planar motor, and/or at least one operationally non-controllable pose is unable to meet a specification for a required stability of the shuttle, and/or at least one operationally non-controllable pose is unable to be set as such with the stators of the planar motor. In the first case, the guide device increases the efficiency of the planar motor and reduces the energy requirement. In the second case, the guide device increases the safety of the planar motor and allows the setting of poses which should not be set per se for reasons of safety. In the third case, the guide device extends the possible range of motion of the shuttle beyond the range that is controllable by the planar motor.

In a further advantageous embodiment, the pose course can comprise passive movement portions, i.e. movement portions which cannot be actuated by the stators of the planar motor and which can be traversed by the shuttle with the help of kinetic and/or potential energy. The shuttles are moved by momentum or by the force of gravity over these non-actuatable movement segments. In this context, the term "non-actuatable" means that the planar motor cannot exert sufficient influence on the movement of the shuttle in these portions.

Advantageously, the position of the shuttle with regard to at least one degree of freedom in the entire pose course can be at least estimated and preferably measured using a sensor system of the planar motor. Even if the efficiency and/or the stability and/or controllability of the shuttle is temporarily not ensured, it may still be possible to measure the position with the help of the sensor system contained in the planar motor either with sufficient accuracy or at least with an accuracy which is sufficient for estimating purposes in specific portions of the pose course. If necessary, the measurement or estimation of the position can be restricted to one or more degrees of freedom that are of particular interest.

In a further aspect, the present disclosure relates to a planar motor having at least one first stator and at least one guide device described herein, wherein the first end is arranged on the first stator, wherein the introductory pose corresponds to an operationally controllable pose in relation to the first stator, wherein the second end is arranged on the first stator or a second stator, and wherein the exit pose corresponds to an operationally controllable pose in relation to the first stator or the second stator.

According to an advantageous embodiment, at least one processing station can be arranged on the guide device. As a result, the pose of the objects transported by the shuttles that are to be processed in the processing station can be adapted as desired to the processing station.

Advantageously, the planar motor can have at least one stator arranged in a first transport plane and at least one stator arranged in a second transport plane, at least one guide device for the shuttle defining a pose course in one or both directions from the first transport plane to the second transport plane. This allows for highly flexible movement patterns to be achieved for the shuttles transported by the planar motor.

In a further aspect, the present disclosure relates to a method for transporting a shuttle with a planar motor described herein, the method comprising the following steps: floating arrangement of the shuttle with a first stator in an introductory pose of the guide device, moving and, if necessary, accelerating the shuttle with at least the first stator in the direction of the pose course of the guide device, moving the shuttle further over at least one shuttle position, which is an operationally non-controllable pose in relation to the stators of the planar motor until the shuttle reaches the exit pose, the guide device supporting and stabilizing the shuttle in the at least one operationally non-controllable position.

The further movement can advantageously take place using magnetic fields that are built up by stators of the planar motor. This is particularly advantageous if the shuttle has lost its controllability in relation to one or more secondary directions, but can still be controlled in at least one of the main directions or remaining secondary directions by the magnetic field of the stators.

Alternatively or in addition, the further movement can advantageously take place using a kinetic energy of the shuttle. This means that the shuttle can also overcome portions in which controllability has substantially been completely lost.

As an alternative or in addition, the further movement can take place using a potential energy of the shuttle, as a result of which the shuttle can possibly also cover very long distances if these result in a reduction in the potential energy.

In a further alternative embodiment, the further movement can take place by pushing and/or pulling with at least one further shuttle. In this way, for example, guide devices can be used in the manner of a first-in-first-out principle.

Embodiments are directed to a guide device for at least one shuttle of a planar motor. The guide device includes a first end and a second end and a pose course of the at least one shuttle defined between the first end and the second end, where the first end defines an introductory pose of the at least one shuttle and the second end defines an exit pose of the at least one shuttle. The first end is positionable on a first stator of the planar motor so that the introductory pose corresponds to an operationally controllable pose in relation to the first stator, and wherein the second end is positionable on one of the first stator or a second stator of the planar motor so that the exit pose corresponds to an operationally controllable pose with respect to the one of the first stator or the second stator. Further, the pose course includes at least one pose, which is an operationally non-controllable pose with respect to the stators of the planar motor, and the at least one shuttle is supported and stabilized in the at least one operationally non-controllable pose.

In embodiments, mobility of the at least one shuttle can be ensured by stators of the planar motor along the pose course from the first end to the second end.

In other embodiments, the at least one operationally non-controllable pose may have a deviation of at least one of yaw angle ($\psi$), pitch angle ($\theta$), roll angle ($\varphi$) or stroke height from an operationally controllable pose.

According to embodiments, the pose course may run substantially parallel to a transport plane of the planar motor.

According to other embodiments, the pose course can extend from a first transport plane of the planar motor to a second transport plane of the planar motor, and the at least one shuttle may be movable in one or both directions of the pose course between the first transport plane and the second transport plane. The first transport plane may be arranged parallel to the second transport plane. Further, the first transport plane and the second transport plane may enclose an angle, and the enclosed angle can be a right angle.

In accordance with embodiments, the guide device may form at least one of a bridge or underpass for the at least one shuttle between the first end and the second end.

In further embodiments, the guide device can include at least one of a mechanical guide, a magnetic guide, an electromagnetic guide or a pneumatic guide.

According to still other embodiments, the at least one operationally non-controllable pose at least one of: violates a specification for at least one of safe or efficient operation of the planar motor, does not meet a specification for a required stability of the shuttle, or cannot be set with the stators of the planar motor.

In embodiments, the pose course can include passive movement portions, which cannot be actuated by the stators of the planar motor and which can be traversed by the shuttle with the help of at least one of kinetic or potential energy.

According to embodiments a position of the at least one shuttle with regard to at least one degree of freedom in an entire pose course may be estimatable. Further, the position of the at least one shuttle with regard to at least one degree of freedom in an entire pose course can be measurable via a sensor system of the planar motor.

Embodiments are directed to a planar motor that includes at least one first stator and at least one embodiment of the above-described guide device. The first end can be arranged on the first stator and the second end is arranged the one of the first stator or the second stator, and the introductory pose may correspond to an operationally controllable pose in relation to the first stator, and the exit pose may correspond to an operationally controllable pose in relation to the first stator or the second stator.

According to embodiments, at least one processing station can be arranged on the guide device.

In accordance with embodiments, the planar motor may have at least one stator arranged in a first transport plane and may have at least one stator arranged in a second transport plane. The at least one guide device can define the pose course in which the at least one shuttle is movable in one or both directions of the pose course between the first transport plane and the second transport plane.

Embodiments are directed to a method for transporting at least one shuttle with the above-described planar motor. The method includes arranging the at least one shuttle in a floating manner with the first stator in the introductory pose of the guide device; at least one of moving or accelerating the at least one shuttle with at least the first stator in a direction of the pose course of the guide device; and further moving the at least one shuttle over at least one shuttle position, which is an operationally non-controllable pose in relation to the stators of the planar motor until the at least one shuttle reaches the exit pose. The guide device supports and stabilizes the at least one shuttle in the at least one operationally non-controllable position.

In embodiments, the further moving can use magnetic fields which are built up by stators of the planar motor.

In other embodiments, the further moving may use uses kinetic energy of the at least one shuttle.

According to still other embodiments, the further moving may use potential energy of the at least one shuttle.

In accordance with still yet other embodiments, the further moving may include at least one of pushing or pulling the at least one shuttle with at least one further shuttle.

Other exemplary embodiments and advantages of the present invention may be ascertained by reviewing the present disclosure and the accompanying drawing.

BRIEF DESCRIPTION OF THE DRAWINGS

The present invention is explained in more detail below with reference to FIGS. 1 to 10, which show schematic and non-restrictive advantageous embodiments of the invention by way of example. In the drawings.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
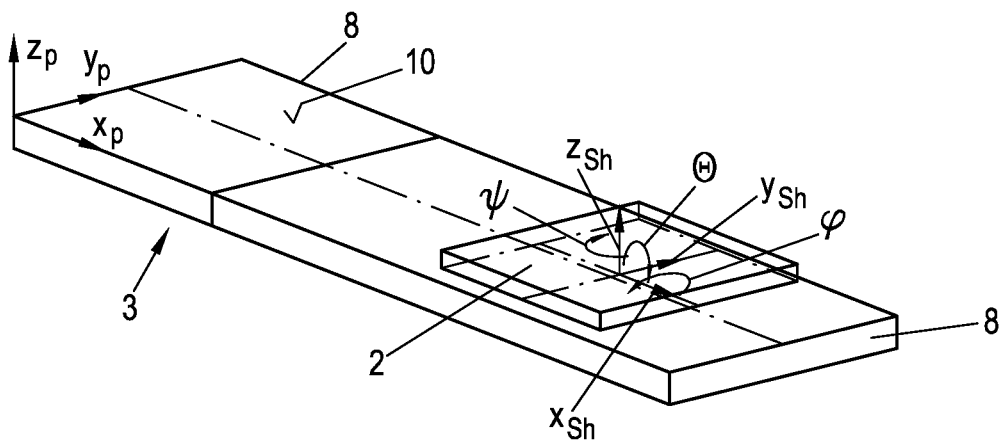
FIG. 1 is a schematic representation of a planar motor having a shuttle arranged thereon.

FIG. 1 shows a schematic representation of a planar motor 3 with two adjacent stators 8 which define a transport plane 10 and a shuttle (transport unit) 2 being arranged in a floating manner above the transport plane 10. If necessary, the totality of the stator elements that form the transport plane 10 can also be viewed as a single stator. For the planar motor 3, a coordinate system $x_P$, $y_P$, $z_P$ that is fixed to the body and connected to the stators can be defined, wherein the transport plane 10 can be placed in the main plane $x_P$-$y_P$, for example.

With the aid of such a planar motor 3, high-precision movements of the floating shuttle 2 can in principle be carried out in the direction of all six rigid body degrees of freedom. Due to the modular structure of the stators 8 in a segment arrangement, translational movements in two main directions of movement are virtually unrestricted, and restricted movements in the four remaining secondary directions of movement (1× translation and 3× rotation) are also possible as a rule. The required forces are generated by (electro) magnetism. In the case of certain planar motors, a substantially unrestricted rotation about the z-axis is also possible.

The movements of the shuttle 2 can be described by a coordinate system ($x_{Sh}$, $y_{Sh}$, $z_{Sh}$) that is firmly connected to the shuttle, or by the position, movement, and acceleration of this coordinate system in relation to the coordinate system of the stators 8. The two main directions of movement, $x_P$ and $y_P$, are arranged substantially parallel to the transport plane 10 of the planar motor 3. The movement space also includes four secondary directions of movement, namely a translation along the secondary direction of movement $z_P$ (raise and lower) and all three rotations. The rotations are called roll $\varphi$ around the x-axis, pitch $\theta$ around the y-axis, and yaw $\psi$ around the vertical axis z.

The movements in the secondary directions of movement are typically limited physically or due to construction. For example, the secondary direction of movement along the vertical axis $z_P$ is limited due to the magnetic flux density, which decreases exponentially with the stroke height. The yaw around the vertical axis is typically (but not necessarily) limited due to the interaction between the stator coils and the magnet units on the shuttle. Above a specific yaw angle $\psi$, the planar motor 3 can, among other things, lose the controllability of the rotation around the vertical axis. The remaining two rotations are substantially limited due to the space required for the rotation, i.e., again due to the necessary stroke movement and the loss of controllability (due to the limitation of the maximum forces/torques) and observability. For applications that lead the shuttle out of this restricted region, external manipulators (for example robots) can be used, but this is associated with considerable technical effort.

Figure 2:
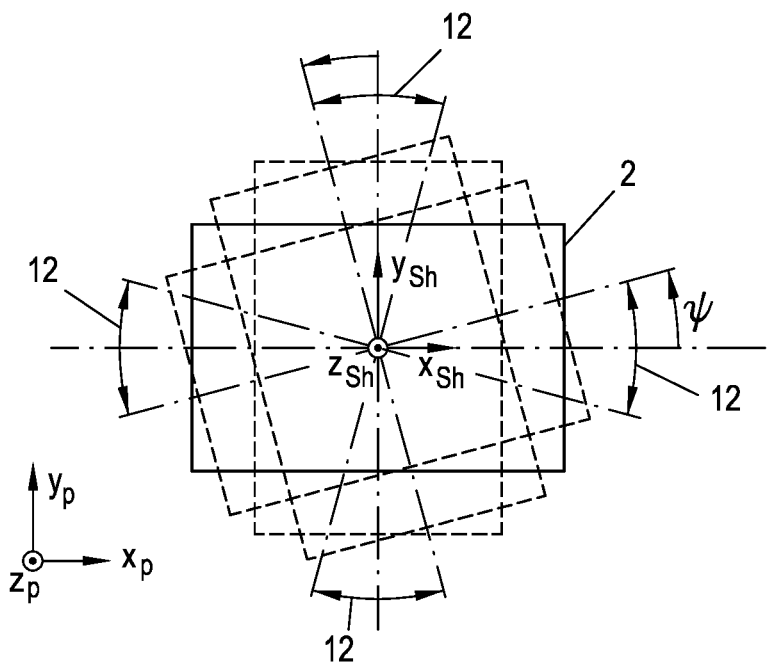
FIG. 2 is a schematic representation of a shuttle in a plan view.
Figure 3:
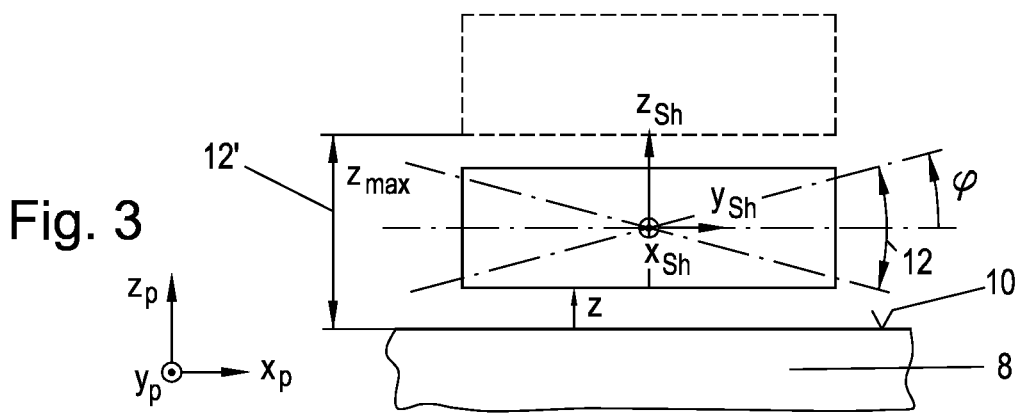
FIG. 3 is a schematic representation of a shuttle in a side view.

The movements that can be carried out by the shuttle 2 are shown schematically in FIGS. 2 and 3. FIG. 2 shows a shuttle 2 in a plan view. The shuttle 2 can, for example, be arranged in a first main position with respect to the stator (whose position is represented by the coordinate system $x_P$, $y_P$, $z_P$), the first main axis $x_{Sh}$ being arranged parallel to the corresponding first main axis $x_P$ of the stator 8 or in a second main position, the first main axis $x_{Sh}$ being arranged parallel to the corresponding second main axis $y_P$ of the stator 8. By appropriately controlling the stators 8, it is possible to move the shuttle 2 along the main axes $x_P$, $y_P$. It is also possible, starting from these main positions, to pivot the shuttle 2 around the vertical axis $z_P$ in a positive or negative direction (yaw ψ). However, this movement is typically only possible to a limited extent due to the design, since the shuttle 2 loses its controllability if the deviation is too great, i.e., it is no longer controllable by the stator 8 or at least no longer fully controllable, or it is no longer observable. In relation to the stator coordinate system, a range of operationally controllable poses (or positions) 12 can thus be defined.

FIG. 3 shows a schematic representation of a shuttle 2 in a side view, the shuttle 2 being arranged floating above the transport plane 10 at a distance z. In this case, too, there is a region for rolling φ around the first main axis $x_P$, which defines operationally controllable poses 12. (In an analogous way, such a range can be specified for the pitch θ about the second main axis $y_P$). The distance z from the transport plane 10 can also be varied up to a maximum stroke height $z_{max}$, this also defining a region with operationally controllable poses 12'.

Since shuttles 2 in poses that are outside the operationally controllable poses 12 have no or only poor controllability or no operationally actuation is possible, it is not possible with conventional planar motors 3 to move a shuttle 2 beyond the region of the operationally controllable pose 12. For numerous applications, however, it would be desirable to overcome this technical limitation.

According to the present disclosure, a guide device 1 (see FIG. 4) is therefore proposed which allows the shuttles 2 to also use poses outside of the operationally controllable pose 12. The shuttle 2 is forcibly guided by the guide device 1 in such a way that a further movement is possible with the remaining electromagnetic, kinetic, or potential force acting on the shuttle. As a result, the permissible range of movement in the secondary directions of movement can be increased. In the extreme case, when the controllability in the propulsion direction is completely lost, i.e., no adequate electromagnetic force action is possible in this direction, the kinetic or potential energy of the shuttle can be used to overcome the movement resistance in the corresponding transient non-controllable transition region. In principle, all technically available methods, such as contact-based and/or non-contact guides, can be used for the additional guide device 1 of the shuttles in portions.

Figure 4:
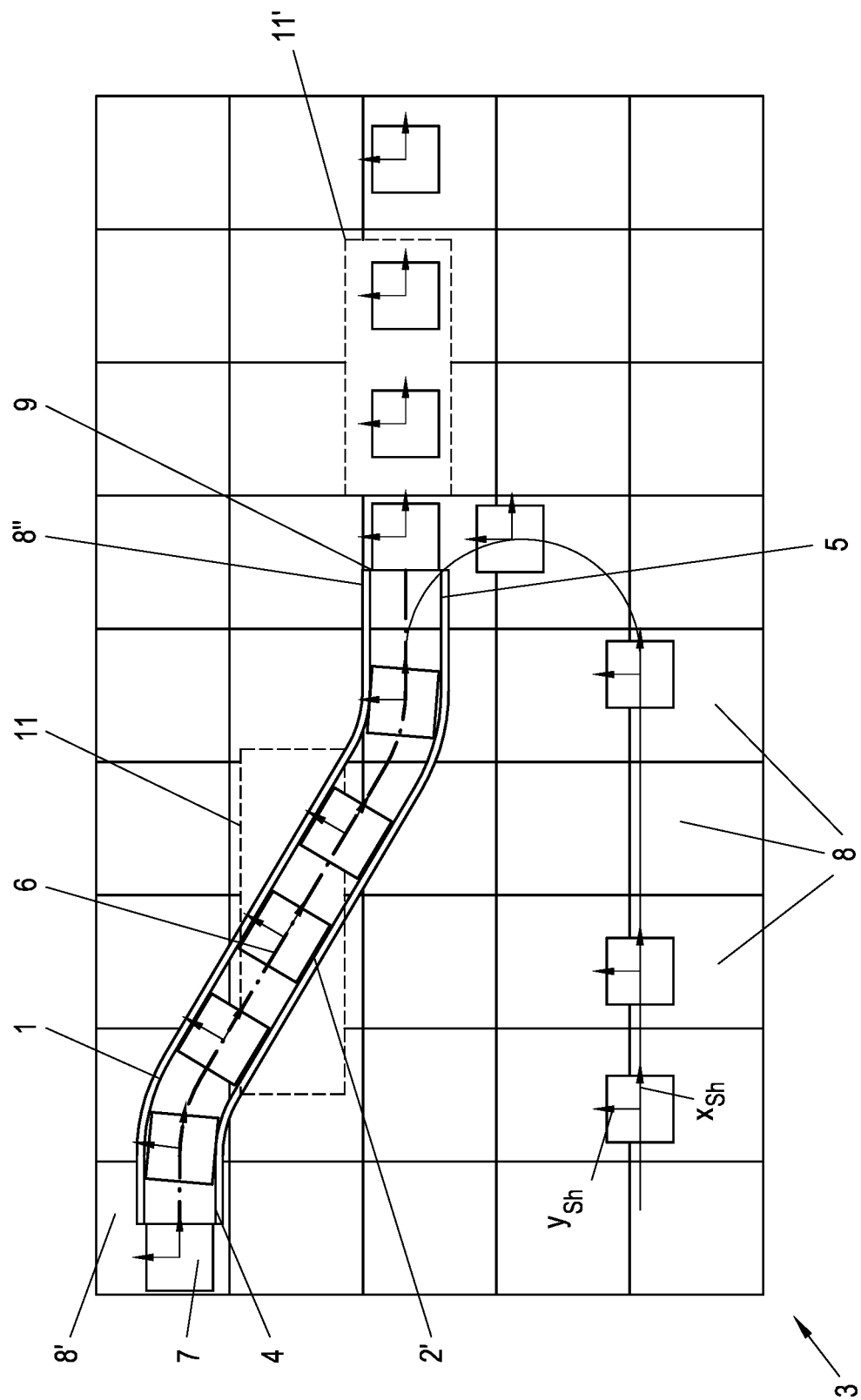
FIG. 4 shows a planar motor with a guide device arranged thereon in a plan view.

FIG. 4 shows a planar motor 3 with a plurality of stators 8, which are arranged in a transport plane. The planar motor 3 can move a large number of shuttles 2 simultaneously floating over the entire region of the transport plane, for example, to process objects arranged on the shuttles 2 in processing stations 11, 11', which are shown schematically in FIG. 4 as rectangular regions. For processing in the first processing station 11, it is advantageous to arrange the shuttle at an angle which differs so greatly from the "normal position" that it is not operationally controllable. If one were therefore to try to set this pose of the shuttle 2 (the pose is provided with the reference sign 2' in FIG. 4) with the planar motor 3, the shuttle 2 would come into an inadmissible or even uncontrollable state. In order to nevertheless allow processing in the first processing station 11, a guide device 1 is provided which includes, for example, of two parallel slide rails or roller arrangements, between which the shuttle 2' is movable along a pose course 6 (shown in FIG. 4 as a dash-dot line) while it is stably positioned with regard to its yaw angle ψ. Thus, in the region of the first processing station 11, the guide device 1 prevents the shuttle 2' guided therein from executing an uncontrolled rotation about the vertical axis $z_P$ and the movement parallel to the transport plane is also restricted to a movement along the pose course 6.

In order to process the shuttle 2' in the processing station 11, shuttle 2' is moved by the stators 8 into an introductory pose 7, which is located on the stator identified by the reference sign 8'. At a first end 4 of the guide device 1, the shuttle 2' can be moved out of the introductory pose 7 into the guide device 1 along the pose course 6. With a further movement of the shuttle 2' guided by the guide device 1 along the pose course 6, the shuttle 2' is rotated about the vertical axis from a pose of complete controllability. Even if the stators 8 are actually not capable of moving a shuttle into such a twisted pose on their own, it is still possible to move the shuttle 2' with the stators 8, forcibly guided by the guide device 1, along the pose course 6 or also to keep it stable in its respective position. The processing in the processing station 11 can either take place with the shuttle 2' stationary, or while the shuttle 2' is moved along the pose course 6 at a speed and, if necessary, acceleration that is tailored to the processing.

By restricting the degrees of freedom of the shuttle 2' with the guide device, it is now possible to move the shuttle 2' in a stable manner along the pose course 6 using the magnetic fields of the stators 8, although the yaw angle w is actually outside of an operationally controllable pose.

In front of the second end 5 of the guide device 1, the shuttle 2' is pivoted again into an operationally controllable pose by the guideway 1 and leaves the second end 5 of the guide track 1 in an exit pose 9, the stator on which the exit pose 9 is located being identified by the reference sign 8".

In alternative embodiments, it is also possible for a shuttle 2 to lose its controllability completely (i.e., for all (or substantially all) translational and rotational directions of movement while it is forcibly guided by the guide device 1. In that case, the further movement of the shuttle along the pose course 6 can be ensured either by using the potential energy or by using the kinetic energy of the shuttle.

Figure 5:
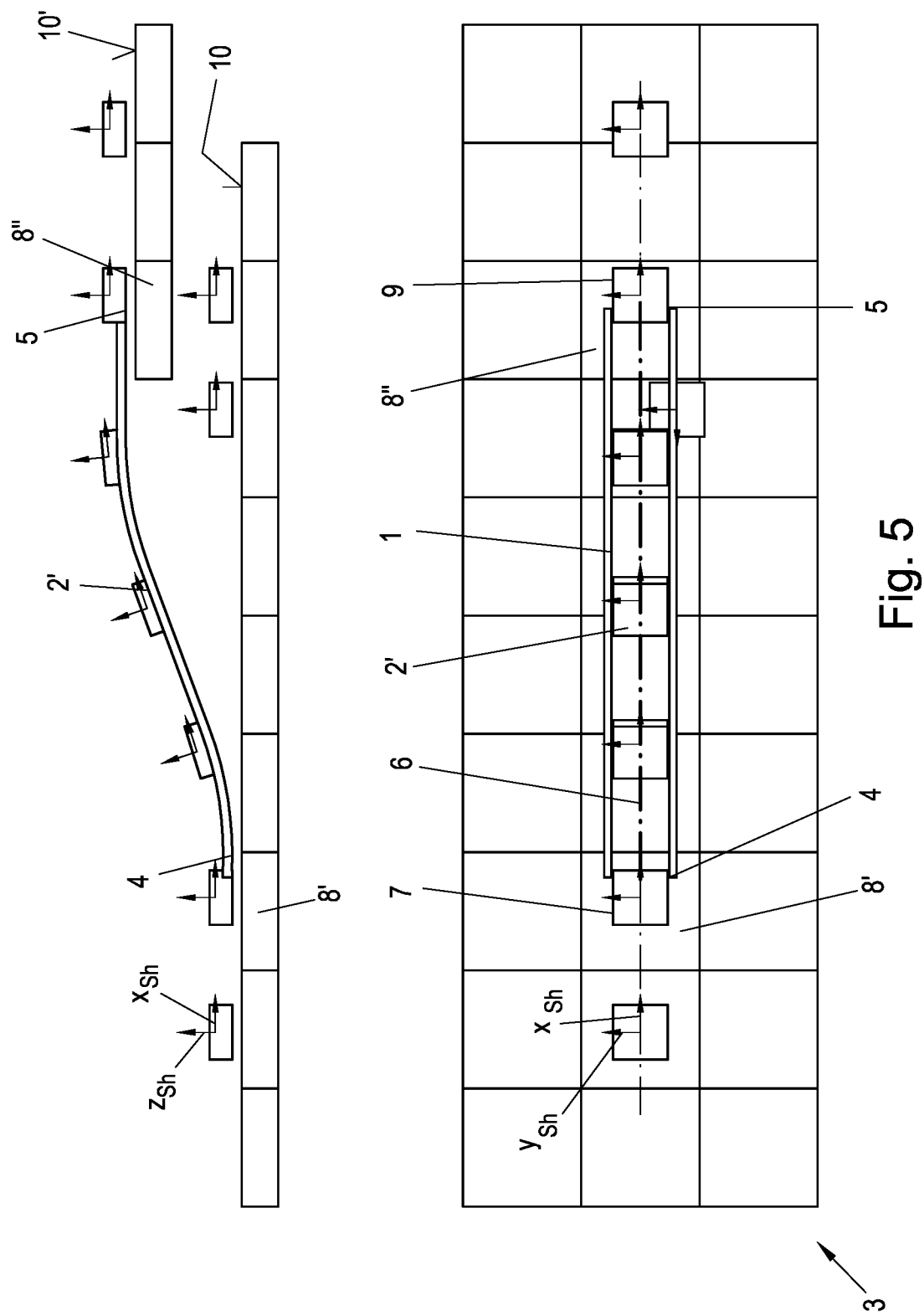
FIG. 5 shows a planar motor with a guide device arranged thereon in two cracks, stators being arranged in two mutually offset planes.

Such an embodiment is shown by way of example in FIG. 5. The planar motor 3, which is shown has two levels in FIG. 5, in this case has stators which are arranged in two different transport planes 10, 10'. The two transport planes 10, 10' are offset parallel to each other, whereby the transport planes 10, 10' can be arranged horizontally (one above the other), for example, but also vertically or at an angle, as far as this is technically possible with the combination of stators 8 and shuttles 2 used.

A guide device 1 is arranged between the two transport planes and a shuttle 2' is arranged thereon to be forcibly guided in a movement along a pose course 6. The guide device 1 can for example be designed as a mechanical guide, such as a sliding guide or roller conveyor, or as an (electro) magnetic or pneumatic guide and allows for a shuttle 2 to be moved from the first transport plane 10 to the second transport plane 10', or also vice versa. For this purpose, the shuttle is again first moved into an introductory pose 7, which is defined in relation to a first end 4 of the guide device 1. From the introductory pose 7, the shuttle is moved by the stators 8 in the direction of the pose course 6, whereby it is either accelerated out of the introductory pose 7 or has already been moved into the introductory pose 7 at a corresponding speed.

With a further movement along the pose course 6, the shuttle 2 is lifted from the first transport plane 10 in the direction of the vertical axis $z_P$ and the shuttle is pivoted about the second main axis. In the pose shown with the reference sign 2', the shuttle 2' has now left the poses of complete controllability, since it is too far away from the stators 8 of the first transport plane 10, so that the magnetic fields generated by these stators 8 cannot have a sufficient effect on the shuttle 2' or its position/state can no longer be detected. Since the shuttle 2' can no longer be influenced by the stators 8 in this pose, the control must ensure that when reaching an operationally non-controllable pose, a sufficient speed is reached so that the shuttle 2' reaches again an operationally controllable pose at the second end 5 of the guide device 1 using the existing momentum (initial kinetic energy) and possibly with the help of the force of gravity (potential energy) without getting stuck in the guide device 1 or moving in the wrong direction due to gravity. The shuttle is slowed down by dissipative forces, for example friction, air resistance, eddy current losses, by withdrawing the initial kinetic energy from the shuttle. The initial kinetic energy substantially depends on the initial speed and the weight of the shuttle. The potential energy substantially depends on the arrangement of the planar motor and the direction in which the acceleration due to gravity acts.

A non-controllable (stationary) shuttle that has gotten stuck in the guide device 1 can optionally be "pushed" or "pulled" out of the guide with the aid of another shuttle.

At the second end 5 of the guide device 1, the shuttle 2 comes back into the region of influence of the stator 8" of the second transport plane 10', whereby it is again in an operationally controllable pose in the exit pose 9. Using the same principle, a movement of a shuttle 2 in the opposite direction, i.e. from the second end 5 to the first end 4, can also be implemented, the ratios only differing with regard to the force of gravity.

Figure 6:
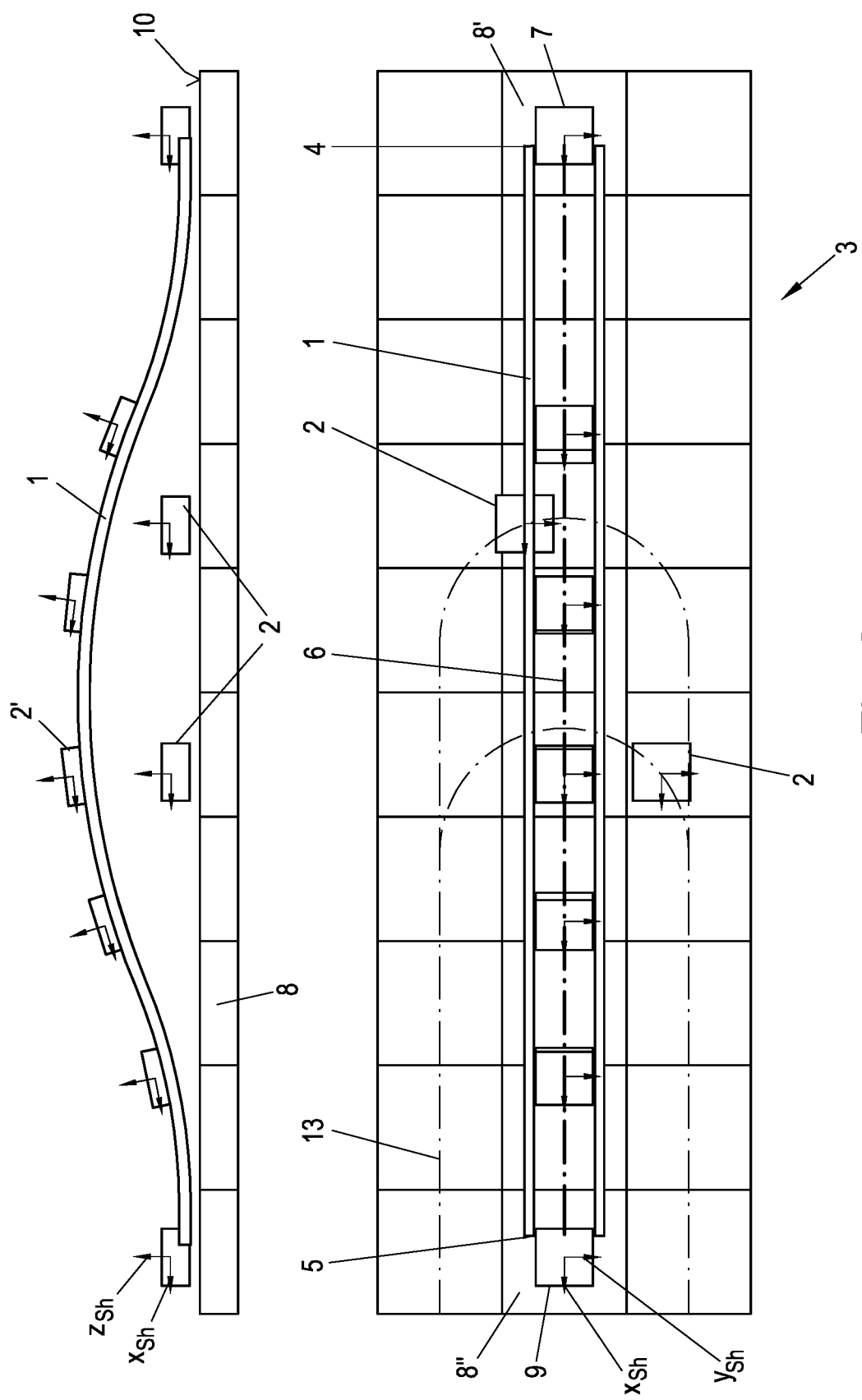
FIG. 6 shows a planar motor with a guide device arranged thereon in two cracks according to a further embodiment.

FIG. 6 shows a further embodiment of a planar motor 3 having a guide device 1 which has the function of a "bridge." The stators 8 of the planar motor 3 are arranged in a single transport plane 10, the two shuttles 2 shown on the transport plane 10 moving along a plurality of trajectories 13 which, for example, can be predetermined as a result of the process. A traversing of such trajectories 13 by another shuttle 2 is easily possible per se, but the time must be coordinated with the shuttles 2 that move on the trajectories 13. This can be problematic, in particular on highly frequented routes, and may cause "traffic jams" at intersections. Instead of the bridge, an "underpass" can also be implemented in an analogous manner, the guide device 1 guiding the shuttle 2 down through an opening in the transport plane 10 and guiding it up again at an opposite end through a further opening.

With the guide device 1 shown in FIG. 6, a shuttle 2' can be moved from an introductory pose 7 on a first end 4 of the guide device 1 (stator 8') to an exit pose 9 on a second end 5 of the guide device 1 (stator 8") and thereby traverse the trajectories 13 without affecting the transport on the trajectories 13. The guide device 1 (or the pose course 6 defined by it) runs parallel to the transport plane 10 in the region of the first end 4, then pivots upwards (in relation to the transport plane 10) and forms a bridge over the stators 8 below, in which the trajectories 13 lie. The bridge is sufficiently high to prevent the shuttles 2' sliding on the guide device 1 from being influenced by the magnetic fields of the stators 8 below, which transport the shuttles 2 in the transport plane 10 along the trajectories 13. In the further course, the guide device 1 or the pose course 6 swings down again and approaches the transport plane 10 again, the shuttles 2' sliding on the guide device 1 again reaching an operationally controllable pose and moving further from the stators 8 to the second end 5 of the guide device 1. The pose course 6 defined by the guide device 1 runs in the region of the second end 5, or the exit pose 9, again parallel to the transport plane, so that an undisturbed transition of the shuttle 2' from the guided transport to the normal transport through the stators (in the case of the stator 8") is ensured.

The guide device 1 shown in a bridge-like manner in FIG. 6 can be used not only with planar motors 3, the transport plane 10 of which is arranged horizontally, but also with a vertical or inclined transport plane 10, whereby the force of gravity acting on the shuttle 2' must be taken into account. The guide device 1 shown in FIG. 6 can also be used to bridge other obstacles, for example to transport shuttles 2' over regions in which no stators 8 are arranged. If necessary, the guide device 1 can also have a course that is curved in another direction, for example in order to form curves, or a pivoting of the shuttles 2' can be implemented when passing through the guide device 1.

Figure 7:
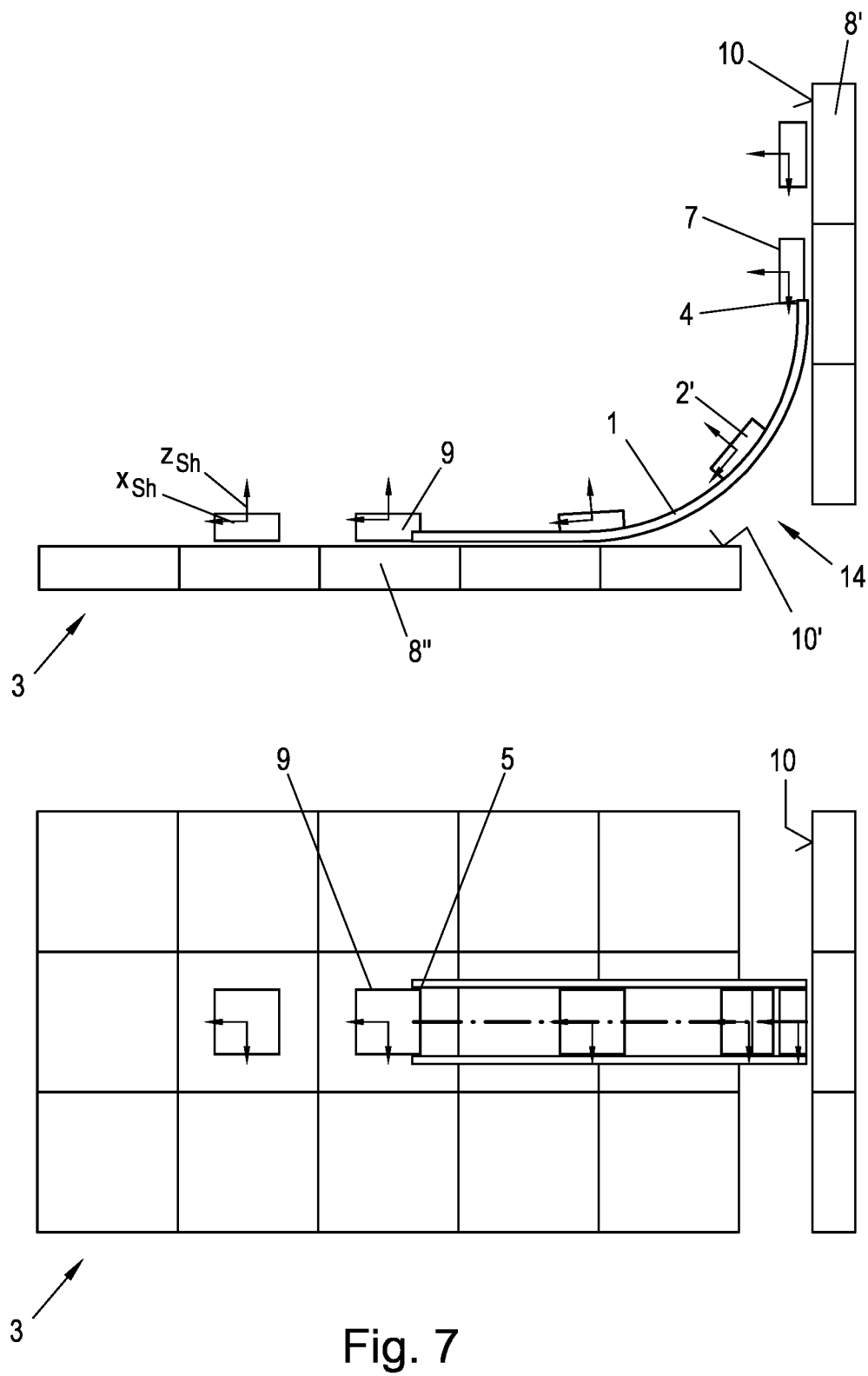
FIG. 7 shows a planar motor with a guide device arranged thereon in two cracks, stators being arranged in two planes normal to one another.

FIG. 7 shows a further embodiment of a planar motor 3 having a guide device 1 which is arranged to transfer a shuttle 2' from a first transport plane 10 to a second transport plane 10', which is arranged substantially at a right angle to the first transport plane 10 (or vice versa). For this, it is necessary that the shuttle 2' bridges an intermediate region 14 in which its pose does not correspond to any operationally controllable pose neither with regard to any stator 8 of the first transport plane 10, nor with regard to a stator 8 of the second transport plane 10'. The change from one transport plane 10 to the other transport plane 10' via the guide device 1 substantially corresponds to the procedure that has already been disclosed in detail in connection with the description of the other drawings. The guide device 1 shown in FIG. 7 can also be used in both directions, with the force of gravity acting on the shuttle 2' having to be taken into account as a function of the orientation of the planar motor 3.

Figure 8:
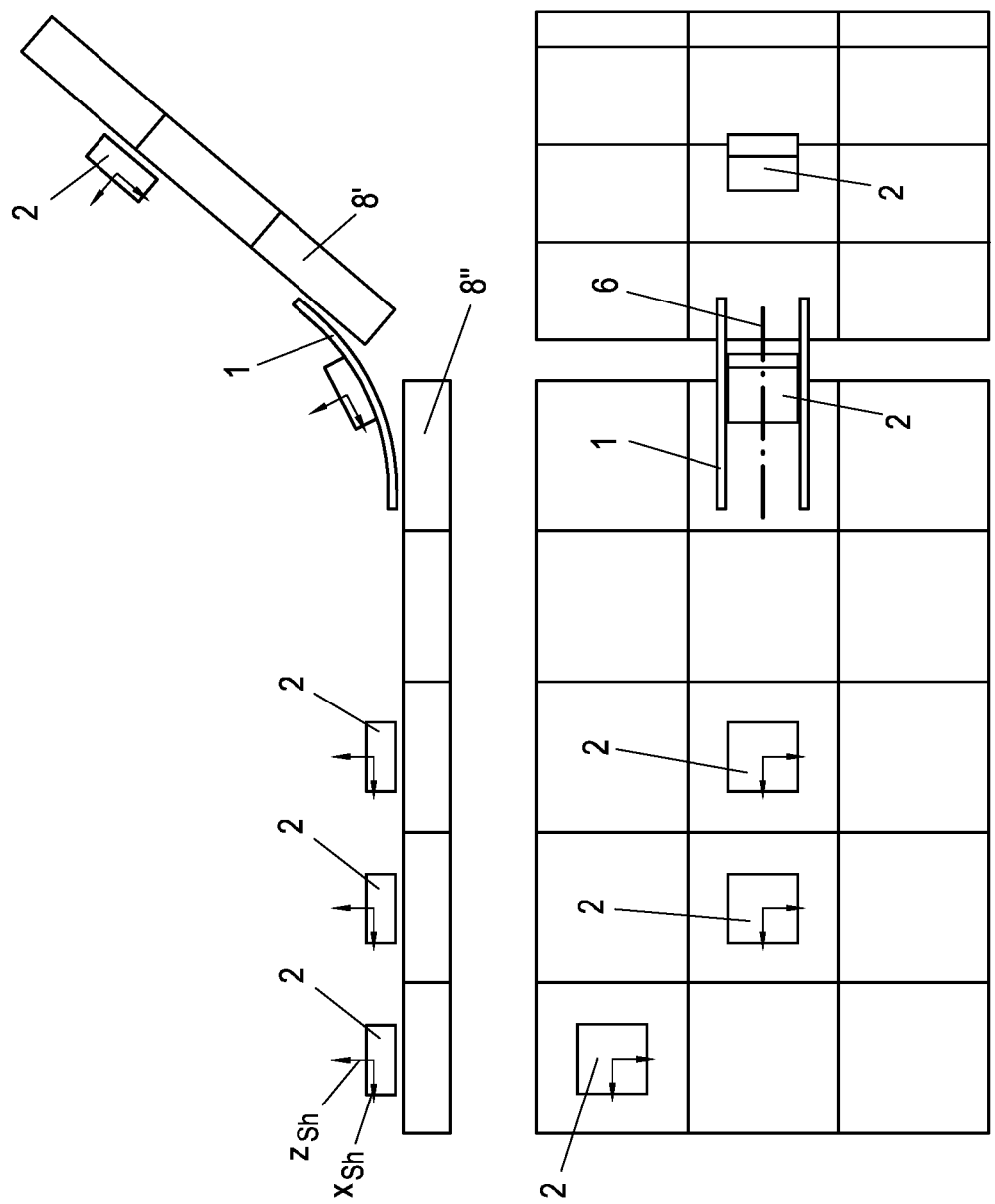
FIG. 8 shows a planar motor with a guide device arranged thereon in two cracks, stators being arranged in two inclined planes.

In a further embodiment, the guide device 1 can also be provided for a change between transport planes 10, 10' which enclose an angle which deviates from the right angle. FIG. 8 shows such an embodiment with a flat angle, the mode of operation again being analogous to that described above.

Figure 9:
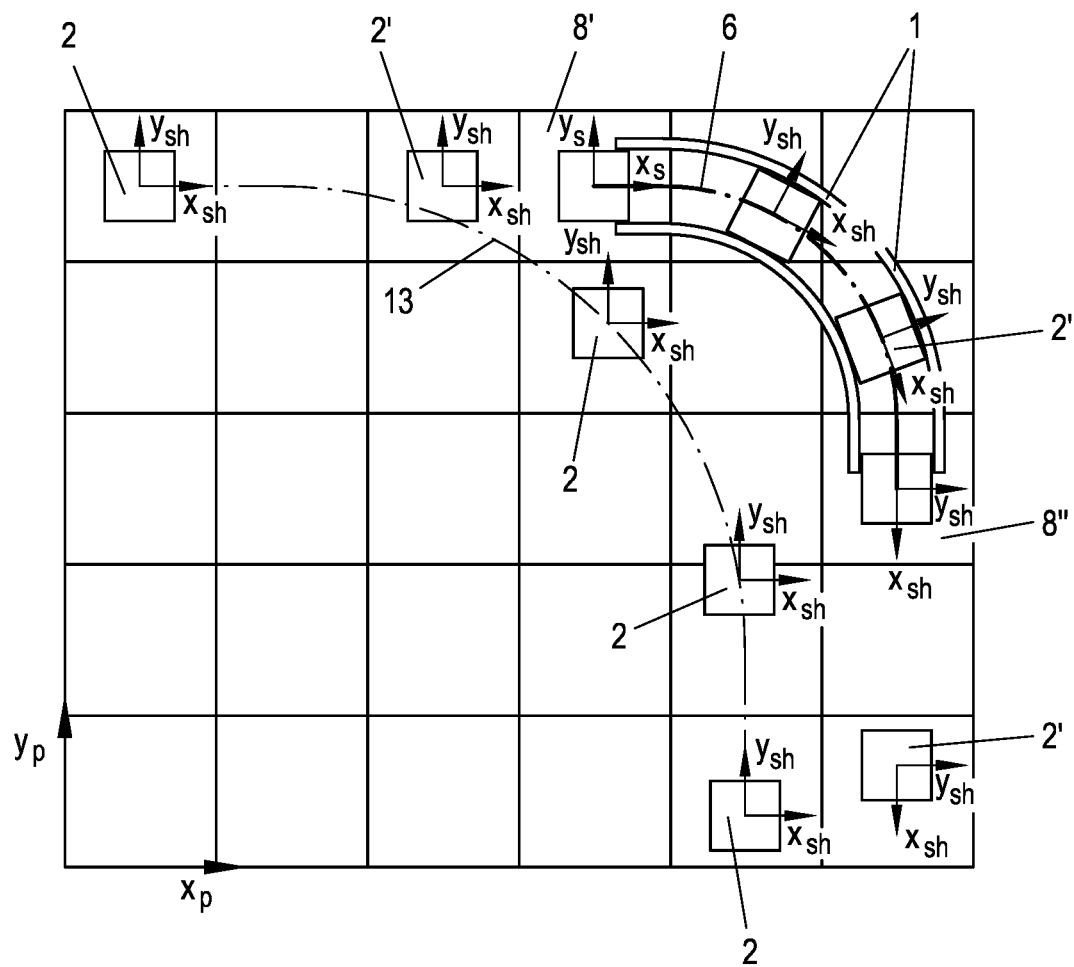
FIG. 9 shows a planar motor with a guide device arranged thereon according to a further embodiment in a plan view.

FIG. 9 shows a further embodiment which can be used in connection with a planar motor which comprises a single transport plane 10. A plurality of shuttles 2 are shown which move along a curved trajectory 13. Due to the limited pivotability of the shuttles 2 about their vertical axis, the movement takes place without rotation, i.e. the main axes $x_{Sh}$ and $y_{Sh}$ of the shuttle 2 remain substantially parallel to the corresponding main axes $x_P$ and $y_P$ of the stators 8 in every position. In many cases, however, it may be desirable for specific shuttles 2' to be "swiveled along" with the curve. In the present case, in which the trajectory 13 swivels through 90°, this corresponds to a rotation of the shuttle 2' through 90° as well. The guide device 1 shown in FIG. 9 serves precisely this purpose and forces the shuttle 2' when passing through the guide device 1 along the pose course 6 not only to change direction but also to rotate 90° around the vertical axis.

Figure 10:
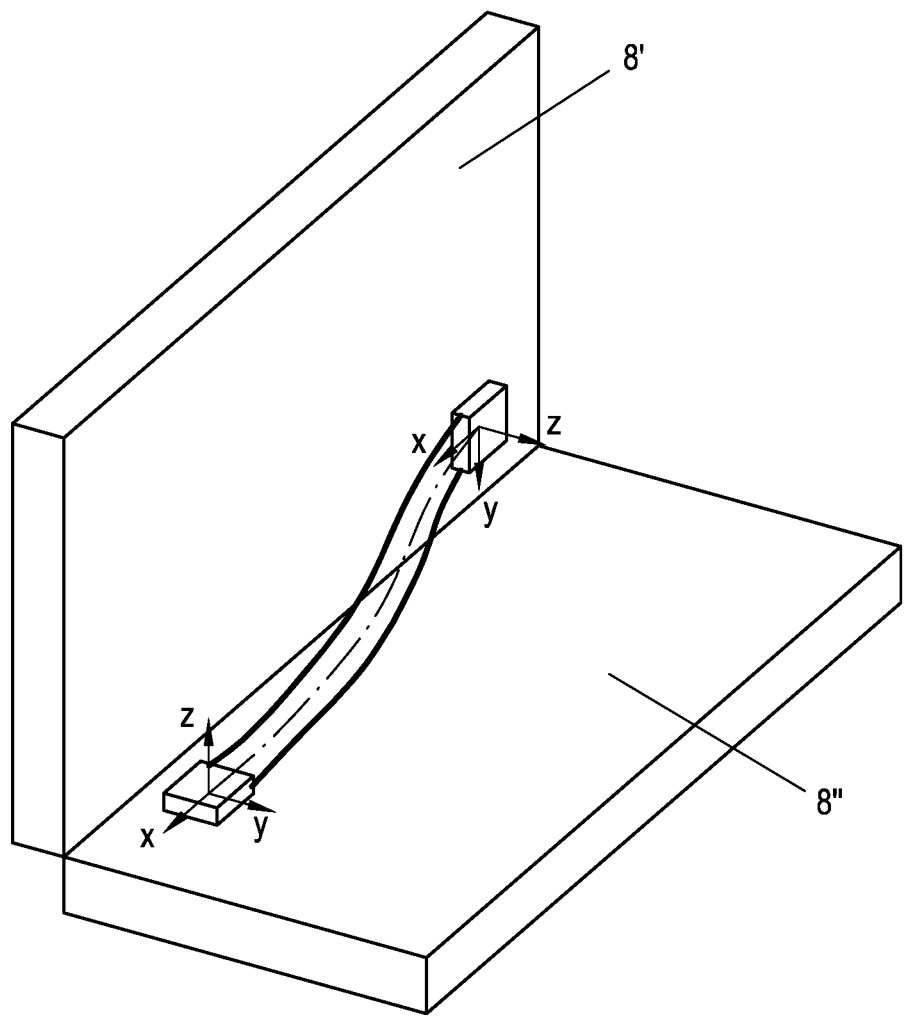
FIG. 10 is a diagrammatic representation of a planar motor with a guide device arranged thereon with two stators arranged substantially normal to one another.

If necessary, a guide device 1 can also be provided in order to realize rolling about the first main axis $x_{Sh}$. FIG. 10 shows a corresponding embodiment. Similar to FIGS. 7 and 8, a transition of a shuttle 2' from a first transport plane 10 to a second transport plane 10' is implemented, the second transport plane 10' enclosing an angle with the first transport plane 10. In FIG. 10, the shuttle 2' is moved by the guide device 1 along a pose course 6, the shuttle 2' being rolled through 90° at the same time. If necessary, rolling movements at other angles can be carried out in an analogous manner.

The examples disclosed above can have, inter alia, the following features, all of the features disclosed being combinable with one another as desired, provided that there are no technical hurdles to the contrary. A shuttle 2 floats, completely controllably by stators 8, to the first end 4 of the guide device 1, the alignment of the shuttle 2 being adapted to the guide inlet so that it corresponds to the introductory pose 7. The shuttle 2 moves (floating) into the guide device and, if necessary, accelerates as far as this is possible, necessary, and/or permissible according to the application in the present case. Thereby, the kinetic energy of the shuttle is increased. If during the subsequent movement of the shuttle 2 (forcibly guided by the guide device 1) along the pose course, the potential energy is increased and/or the electromagnetic force in the propulsion direction is completely lost and/or dissipative forces (friction, air resistance, eddy current losses, etc.) act on the shuttle, the kinetic energy can compensate for these losses. In the phase before the complete controllability is lost, the guide device can already withdraw the corresponding degrees of freedom from the shuttle, although the shuttle is still fully controllable. The magnetic forces "released" as a result of the forced operation can be used indirectly for other purposes (e.g. propulsion and/or acceleration). As the movement progresses along the pose course 6, the controllability then decreases, or it can be completely lost in individual directions, possibly also in all directions, and the guide device takes over some of the corresponding forces.

In extreme cases, the shuttle also loses its controllability in (at least one) direction of movement for a second time, i.e. an adequate electromagnetic force is no longer possible. For the necessary further movement of the shuttle along the corresponding degree of freedom (overcoming the resistance to movement), these regions can be bridged with the "stored" kinetic energy of the shuttle and/or the stored potential energy.

After the controllability has reached its minimum, it increases again in the further course of the movement of the shuttle along the pose course and the shuttle regains its full controllability before reaching the second end 5 of the guide device. In this region, the stators can also be used to adjust the speed state again if this was only possible to a limited extent during the previous movement due to the poor or missing electromagnetic force effects. For example, the shuttle can be braked if its speed was increased as a result of the potential energy.

At the second end of the guide device, the shuttle leaves the guide device again floating and in an operationally controllable pose.

In the description and claims, the terms "substantially" or "approximately," unless otherwise stated then and there, mean a deviation of up to 10% of the stated value, if physically possible, both downwards and upwards, otherwise only in the direction that makes sense, degree indications (angle and temperature) to be understood as ±10°.

All quantities and proportions, in particular those to delimit the invention, unless they relate to the specific examples, are to be understood with a tolerance of ±10%. The indication "11%" means for example: "from 9.9% to 12.1%." In terms such as: "a solvent," the word "a" is not to be seen as a numerical word, but as an indefinite article or as a pronoun, if nothing else emerges from the context.

The individual features and variants specified in the individual configurations and examples can (unless otherwise stated then and there) be freely combined with those of the other examples and configurations and can be used in particular to characterize the invention in the claims without necessarily including the other details of the relevant design or the relevant example.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE SIGNS

Guide device 1
Shuttle 2
Planar motor 3
First end 4
Second end 5
Pose course 6
Introductory pose 7
Stator 8, 8', 8"
Exit pose 9
Transport plane 10
Processing stations 11
Full controllability range 12
Trajectory 13
Intermediate region 14

What is claimed:

1. A guide device for at least one shuttle of a planar motor, the guide device comprising:
   a first end and a second end; and
   a pose course of the at least one shuttle defined between the first end and the second end, where the first end defines an introductory pose of the at least one shuttle and the second end defines an exit pose of the at least one shuttle;
   wherein the first end is positionable on a first stator of the planar motor so that the introductory pose corresponds to an operationally controllable pose in relation to the first stator, and wherein the second end is positionable on one of the first stator or a second stator of the planar motor so that the exit pose corresponds to an operationally controllable pose with respect to the one of the first stator or the second stator,
   wherein the pose course comprises at least one pose, which is an operationally non-controllable pose with respect to the stators of the planar motor, and the at least one shuttle is supported and stabilized in the at least one operationally non-controllable pose.

2. The guide device according to claim 1, wherein mobility of the at least one shuttle is ensured by stators of the planar motor along the pose course from the first end to the second end.

3. The guide device according to claim 1, wherein the at least one operationally non-controllable pose has a deviation of at least one of yaw angle ($\psi$), pitch angle ($\theta$), roll angle ($\varphi$) or stroke height from an operationally controllable pose.

4. The guide device according to claim 1, wherein the pose course runs substantially parallel to a transport plane of the planar motor.

5. The guide device according to claim 1, wherein the pose course extends from a first transport plane of the planar motor to a second transport plane of the planar motor, and the at least one shuttle is movable in one or both directions of the pose course from the first transport plane to the second transport plane.

6. The guide device according to claim 5, wherein the first transport plane is arranged parallel to the second transport plane.

7. The guide device according to claim 5, wherein the first transport plane and the second transport plane enclose an angle.

8. The guide device according to claim 7, wherein the enclosed angle is a right angle.

9. The guide device according to claim 1, wherein the guide device forms at least one of a bridge or underpass for the at least one shuttle between the first end and the second end.

10. The guide device according to claim 1, further comprising at least one of a mechanical guide, a magnetic guide, an electromagnetic guide or a pneumatic guide.

11. The guide device according to claim 1, wherein the at least one operationally non-controllable pose at least one of:
   violates a specification for at least one of safe or efficient operation of the planar motor,
   does not meet a specification for a required stability of the shuttle, or
   cannot be set with the stators of the planar motor.

12. The guide device according to claim 1, wherein the pose course comprises passive movement portions, which cannot be actuated by the stators of the planar motor and which can be traversed by the shuttle with the help of at least one of kinetic or potential energy.

13. The guide device according to claim 1, wherein a position of the at least one shuttle with regard to at least one degree of freedom in an entire pose course is estimatable.

14. The guide device according to claim 13, wherein the position of the at least one shuttle with regard to at least one degree of freedom in an entire pose course is measurable via a sensor system of the planar motor.

15. A planar motor comprising:
   at least one first stator; and
   at least one guide device according to claim 1,
   wherein the first end is arranged on the first stator and the second end is arranged the one of the first stator or the second stator, and
   wherein the introductory pose corresponds to an operationally controllable pose in relation to the first stator, and the exit pose corresponds to an operationally controllable pose in relation to the first stator or the second stator.

16. The planar motor according to claim 15, wherein at least one processing station is arranged on the guide device.

17. The planar motor according to claim 15, wherein the planar motor has at least one stator arranged in a first transport plane and at least one stator arranged in a second transport plane,
   wherein the at least one guide device defines the pose course in which the at least one shuttle is movable in one or both directions of the pose course between the first transport plane and the second transport plane.

18. A method for transporting at least one shuttle with a planar motor according to claim 15, the method comprising:
   arranging the at least one shuttle in a floating manner with the first stator in the introductory pose of the guide device;
   at least one of moving or accelerating the at least one shuttle with at least the first stator in a direction of the pose course of the guide device; and
   further moving the at least one shuttle over at least one shuttle position, which is an operationally non-controllable pose in relation to the stators of the planar motor until the at least one shuttle reaches the exit pose;
   wherein the guide device supports and stabilizes the at least one shuttle in the at least one operationally non-controllable position.

19. The method according to claim 18, wherein the further moving uses magnetic fields which are built up by stators of the planar motor.

20. The method according to claim 18, wherein the further moving uses kinetic energy of the at least one shuttle.

21. The method according to claim 18, wherein the further moving uses a potential energy of the at least one shuttle.

22. The method according to claim 18, wherein the further moving comprises at least one of pushing or pulling the at least one shuttle with at least one further shuttle.

* * * * *